(12) United States Patent
Asano et al.

(10) Patent No.: US 7,271,769 B2
(45) Date of Patent: Sep. 18, 2007

(54) ANTENNAS ENCAPSULATED WITHIN PLASTIC DISPLAY COVERS OF COMPUTING DEVICES

(75) Inventors: Takeshi Asano, Kanagawa (JP); Shohhei Fujio, Tokyo (JP); Brian Paul Gaucher, Brookfield, CT (US); Peter Lee, Chapel Hill, NC (US); Duixian Liu, Yorktown Heights, NY (US); Kazuo Masuda, Kanagawa-ken (JP); Hideyuki Usui, Kanagawa-ken (JP); Osamu Yamamoto, Kanagawa-Pre (JP)

(73) Assignee: Lenovo (Singapore) Pte Ltd., Singapore (SG)

(*) Notice: Subject to any disclaimer, the term of this patent is extended or adjusted under 35 U.S.C. 154(b) by 0 days.

(21) Appl. No.: 10/946,868

(22) Filed: Sep. 22, 2004

(65) Prior Publication Data

US 2006/0061512 A1   Mar. 23, 2006

(51) Int. Cl.
*H01Q 1/24* (2006.01)
(52) U.S. Cl. .................. 343/702; 343/873; 343/872; 343/700 MS; 361/683
(58) Field of Classification Search .......... 343/702
See application file for complete search history.

(56) References Cited

U.S. PATENT DOCUMENTS

| | | | | |
|---|---|---|---|---|
| 4,207,574 A * | 6/1980 | Toia | ............ | 343/752 |
| 5,337,061 A * | 8/1994 | Pye et al. | ............ | 343/702 |
| 5,684,672 A * | 11/1997 | Karidis et al. | ............ | 361/683 |
| 6,181,284 B1 * | 1/2001 | Madsen et al. | ............ | 343/702 |
| 6,339,400 B1 * | 1/2002 | Flint et al. | ............ | 343/702 |
| 6,340,952 B1 * | 1/2002 | Tsai et al. | ............ | 343/741 |
| 6,509,876 B1 * | 1/2003 | Jones et al. | ............ | 343/702 |
| 6,531,985 B1 * | 3/2003 | Jones et al. | ............ | 343/702 |
| 6,667,719 B2 * | 12/2003 | LaKomski | ............ | 343/702 |
| 6,853,336 B2 * | 2/2005 | Asano et al. | ............ | 343/702 |
| 6,885,880 B1 * | 4/2005 | Ali | ............ | 455/575.7 |
| 6,977,619 B2 * | 12/2005 | March et al. | ............ | 343/711 |
| 2002/0021250 A1 * | 2/2002 | Asano et al. | ............ | 343/702 |
| 2002/0111194 A1 * | 8/2002 | Behbahani et al. | ............ | 455/566 |
| 2002/0151328 A1 * | 10/2002 | Shin et al. | ............ | 455/557 |
| 2003/0128167 A1 * | 7/2003 | Beard et al. | ............ | 343/702 |
| 2004/0052471 A1 * | 3/2004 | Colombo et al. | ............ | 385/53 |
| 2004/0070541 A1 * | 4/2004 | Andersson et al. | ............ | 343/702 |
| 2004/0113848 A1 * | 6/2004 | Gaucher et al. | ............ | 343/702 |
| 2004/0203488 A1 * | 10/2004 | Sullivan et al. | ............ | 455/90.1 |
| 2004/0257283 A1 * | 12/2004 | Asano et al. | ............ | 343/702 |
| 2004/0263399 A1 * | 12/2004 | Lin et al. | ............ | 343/702 |
| 2005/0001767 A1 * | 1/2005 | Wulff et al. | ............ | 343/700 MS |
| 2005/0062657 A1 * | 3/2005 | Lin | ............ | 343/702 |
| 2005/0099283 A1 * | 5/2005 | Johnson et al. | ............ | 340/447 |

* cited by examiner

*Primary Examiner*—Don Wong
*Assistant Examiner*—Binh Van Ho
(74) *Attorney, Agent, or Firm*—F. Chau & Associates, LLC; Frank V. DeRosa (57) ABSTRACT

Antenna devices are provided comprising antenna structures encapsulated or molded into plastic covers of computing devices to enable wireless communication. For example, one or more antenna structures can be encasulated within, or molded into, a plastic display cover of a portable laptop computer. Embedded antenna designs can include various antenna types that are built using one or more wires or thin metallic strips encapsulated into plastic device covers. Insert/injection molding methods can be used to encapsulate antenna structures in plastic device covers during fabrication of the plastic device covers.

37 Claims, 7 Drawing Sheets

ANTENNAS ENCAPSULATED WITHIN PLASTIC DISPLAY COVERS OF COMPUTING DEVICES

TECHNICAL FIELD OF THE INVENTION

The present invention relates generally to antennas for use with computing devices such as laptop computers. More specifically, the invention relates to antennas that are encapsulated within, or molded into, plastic display covers of computing devices.

BACKGROUND

To provide wireless connectivity and communication between devices in wireless networks/systems (e.g., wireless PAN (personal area network), a wireless LAN (local area network), a wireless WAN (wide area network), a cellular network, etc.), it is necessary to equip such devices with antennas. For example, a WLAN may operate under the known "Bluetooth" standard to provide wireless network connectivity between devices such as a portable laptop computers, servers, printers, keyboards, modems, etc., wherein the devices include antennas to send and receive data via radio frequency (RF) communications.

Figure 1:
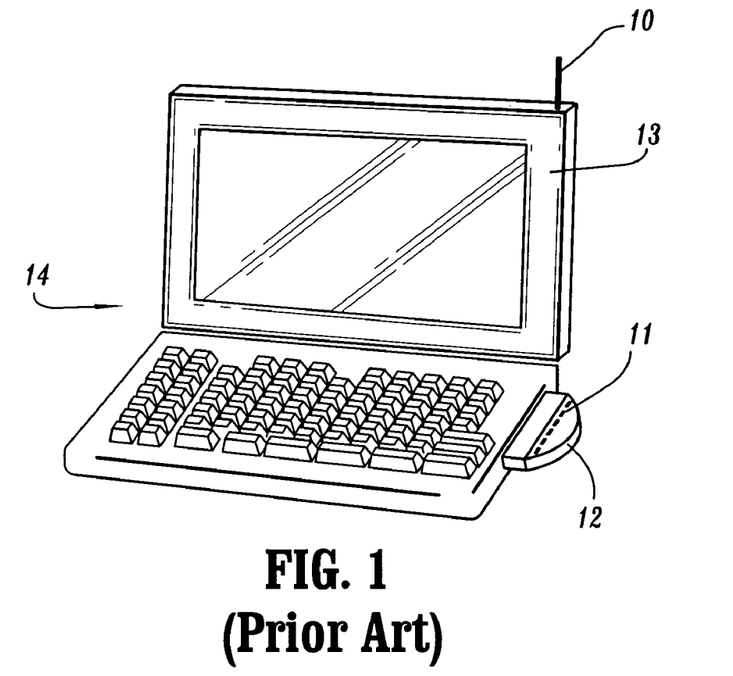
FIG. 1 is a diagram illustrating various conventional embodiments of external antennas for a laptop computer.

With portable laptop computers, an antenna may be located either external to the device or integrated within the device. For example, FIG. 1 is a diagram illustrating various embodiments for providing external antennas for a laptop computer. As depicted in FIG. 1, an antenna (10) can be located at the top of a display unit (13) of a laptop computer (14). Alternatively, an antenna (11) can be located on a PC card (12). The laptop computer (14) can provide optimum wireless connection performance when the antenna (10) is mounted on the top of the display due to the very good RF (radio frequency) clearance. There are disadvantages, however, associated with laptop designs with external antennas including, for example, high manufacture costs, possible reduction of the strength of the antenna (e.g., for a PC card antenna (12)), susceptibility of damage, and the effects on the appearance of the laptop due to the antenna.

Figure 2:
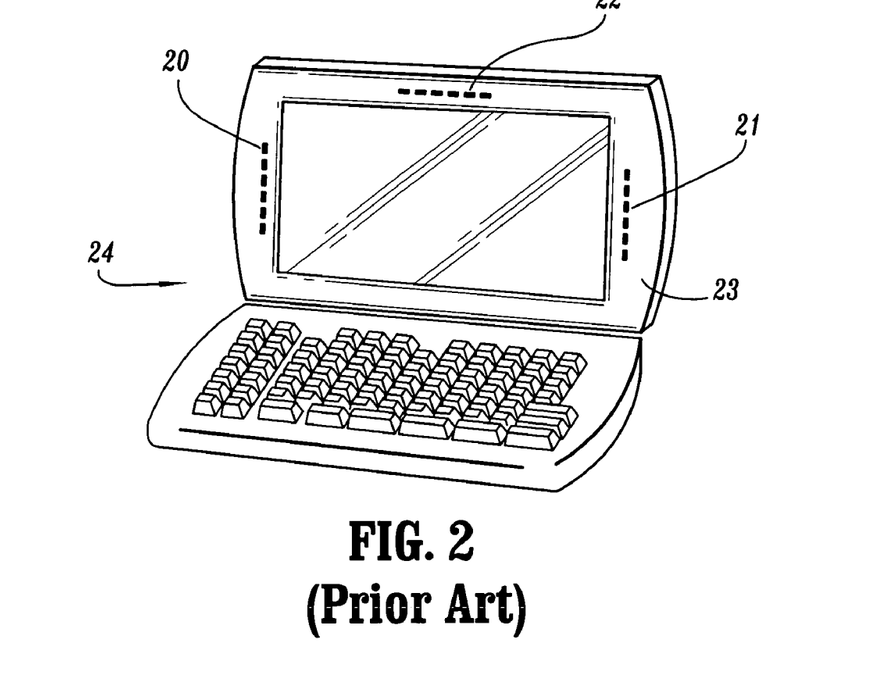
FIG. 2 is a diagram illustrating various conventional embodiments of embedded (integrated) antennas for a laptop computer.

Other conventional laptop antenna designs include embedded designs wherein one or more antennas are disposed within a laptop. For example, FIG. 2 illustrates conventional antenna implementations, wherein one or more antennas (20, 21, 22) (e.g., whip-like or slot embedded antenna) are formed in a display unit (23) of a laptop computer (24). In one conventional embodiment, two antennas are typically used (although applications implementing one antenna are possible) (e.g., two antennas (20, 21) can be placed on the left and right edges of the display), to reduce the blockage caused by the display in some directions and provide space diversity to the wireless communication system. In another conventional configuration, one antenna (20 or 21) is disposed on one side of the display and a second antenna (22) is disposed in an upper portion of the display. This antenna configuration may also provide antenna polarization diversity depending on the antenna design used.

Although embedded antenna designs can overcome some of the above-mentioned disadvantages associated with external antenna designs (e.g., less susceptible to damage), embedded antenna designs typically do not perform as well as external antennas. Another disadvantage associated with embedded antenna designs is that the size of the laptop must be increased to accommodate antenna placement, especially when two or more antennas are used (as shown in FIG. 2).

SUMMARY OF THE INVENTION

In general, exemplary embodiments of the invention include antenna devices comprising antenna structures encapsulated or molded into plastic covers of computing devices (such as laptop computers) to enable wireless communication. For example, in one exemplary embodiment, one or more antenna structures can be encasulated within, or molded into, a plastic display cover of a portable laptop computer. Embedded antenna designs according to exemplary embodiments of the invention can include various antenna types that are constructed using one or more wires or thin metallic strips that are encapsulated into plastic device covers. In one exemplary embodiment of the invention, insert/injection molding methods can be used to encapsulate antenna structures in plastic device covers during fabrication of the plastic device covers.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

In general, exemplary embodiments of the invention include antenna devices comprising antenna structures encapsulated or molded into plastic covers of computing devices to enable wireless communications. For example, plastic covers are widely used in various devices such as portable laptop computers, servers, printers, mouse, keyboards, modems, portable phones, and other types of portable computing devices. By molding/embedding one or more antenna structures within a plastic device cover of such devices, the space required for implementation of antennas in laptop computers or other portable devices is minimized and the antennas are protected from damage. Embedded antenna designs according to exemplary embodiments of the invention include various types of antenna structures that are constructed using one or more wires or thin metallic strips and encapsulated into plastic device covers during fabrication of the plastic covers. In addition, as explained below, antenna devices according to exemplary embodiments of the invention can be designed to operate in the ISM and U-NII bands for WLAN applications, or can be implemented for dual-band and tri-band cellular applications, for example.

Figure 3:
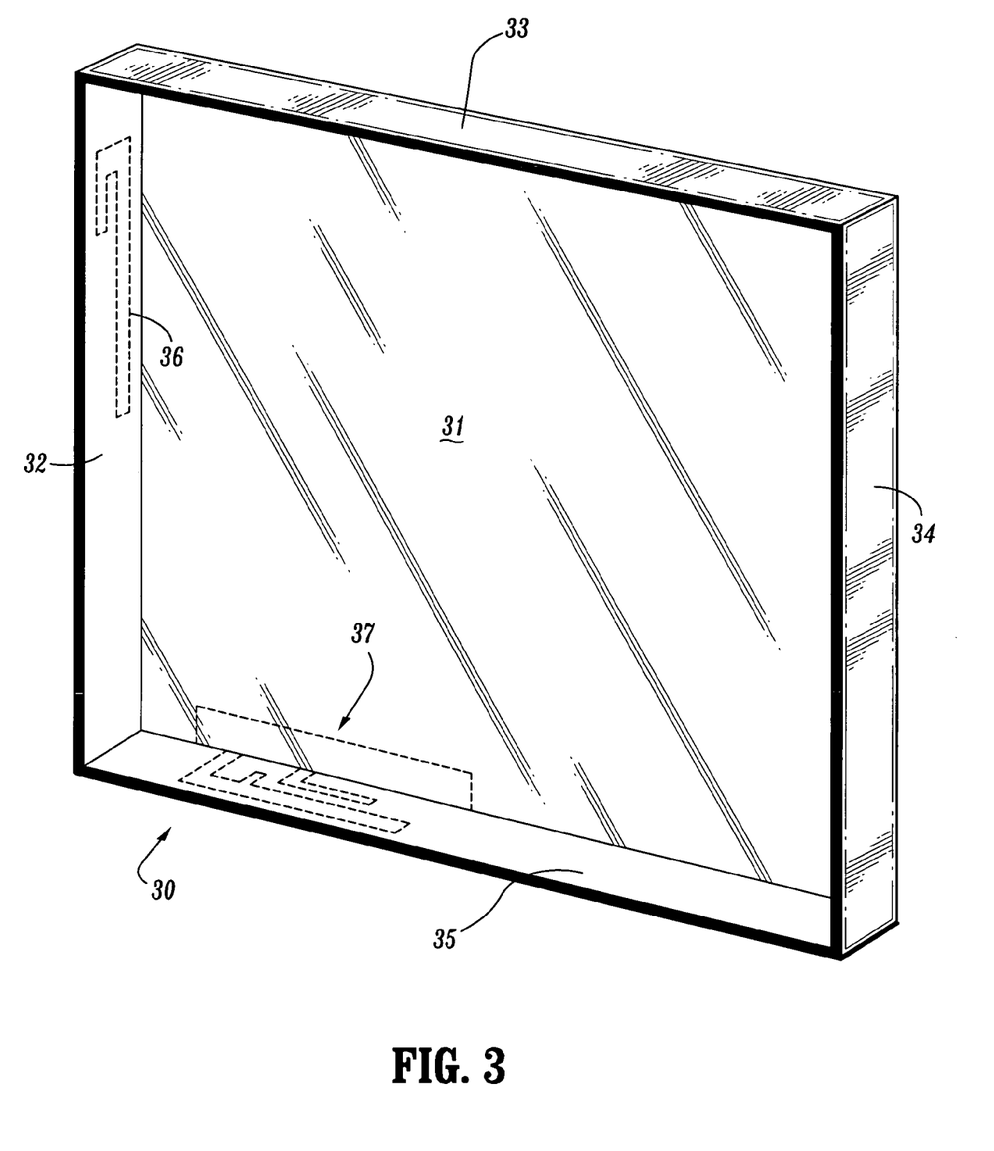
FIG. 3 schematically illustrates an antenna device comprising an antenna structure molded into a plastic cover of a computing device, according to an exemplary embodiment of the invention.

FIG. 3 schematically illustrates an antenna device comprising an antenna structure molded into a plastic cover of a computing device according to an exemplary embodiment of the invention. More specifically, FIG. 3 schematically illustrates a plastic display cover (30) (rear cover) of a laptop computer (without the display unit/screen), having a back panel (31) and four side panels (32, 33, 34 and 35). The display cover (30) comprises an antenna structure (36) (shown in phantom) that is encapsulated in the side panel (32) of the plastic display cover (30) and an antenna structure (37) (shown in phantom) that is encapsulated in a portion of the side panel (35) and back panel (31). In the exemplary embodiment of FIG. 3, the antenna (36) comprises a groundless J-type antenna structure formed of a stamped thin metal strip (the details of which will be discussed below with reference to the exemplary embodiments of FIGS. 7 and 8, for example). The antenna (37) comprises an inverted-F type antenna with radiating elements encapsulated in the side panel (35) and a connecting ground plane encasulated in the back panel (37) (the details of which will be explained with reference to the exemplary embodiment of FIG. 15). The type of antenna structures that are implemented for a given device will vary depending on the application, desired performance, available space, and other factors. In the exemplary embodiment of FIG. 3, multiple antennas can be encapsulated in the display cover (30) to provide a desired space diversity/polarization, etc.

Typically, device covers for portable laptop computers and other devices are formed of plastic materials such as ABS plastics. In accordance with the invention, the plastic device covers provide a dielectric encapsulant for embedded antennas. As such, depending on the application and desired performance, plastic materials such as ABS and other plastics/composites may be implemented, which have desired dielectric constants and loss tangents for a given application, design, desired performance, etc.

In one exemplary embodiment of the invention, embedded antenna designs are achieved using any suitable process that enables antenna structures/elements to be molded into a plastic device cover during fabrication of the plastic device cover. For example, in the exemplary embodiment of FIG. 3, the antenna structure (36) can be molded into the plastic display cover (30) through a process known as insert molding (or injection molding). In general, as is known in the art, insert molding is a process by which an object (or insert) can be placed into a mold between cycles and the plastic is formed around the objects/insert. In accordance with exemplary embodiments of the invention, the inserts comprise one or more metal components (wires, thin metal strips, etc.) that form antenna structures. An insert molding process allows multiple components to be placed within a cavity or part with a single over-molding or injection operation. The resulting molding is a single-piece, encapsulated or perimeter molded finished component (e.g., laptop display cover with one or more encapsulated antennas). The structures and tolerances achievable with an insert molding process rival machined parts and demonstrate excellent dimensional stability without the use of fasteners, adhesives or other assembly methods. Indeed, insert molding can produce complex parts that are not possible with conventional molding techniques.

Furthermore, exemplary embodiments of the invention include methods for feeding antenna structures molded in plastic covers. In one exemplary embodiment, an embedded antenna structure includes feed connection structures that are designed to connect to feed points of the embedded antenna and also protrude from a surface of the plastic cover after completion of the molding process to enable connection to an external feed network. In this embodiment, for example, leads protruding from a display cover can be directly connected to an external balanced feed line or a coaxial cable. If coaxial cables are used, a balun may be used if necessary.

In another exemplary embodiment of the invention, an encapsulated antenna structure can be fed using a capacitive-coupled method. More specifically, by way of example, an embedded antenna structure may be formed having two metal plates embedded in the plastic cover at the antenna feed point(s), while two corresponding metal plates are attached to the surface of the plastic cover and disposed adjacent to the corresponding embedded plates. With this exemplary capacitive coupled method, the thickness of the plastic (dielectric) between the inside and outside plates (i.e., the dielectric spacing between the inner and outer plates) has to be tightly controlled. Moreover, a matching network can be used to provide the necessary impedance matching to take into account the impedance resulting from the capacitive coupling. In this embodiment, the outer plates can be used as points of attachment for an external coaxial cable or balanced differential feed line. Exemplary methods for feeding antenna structures embedded in plastic covers will vary depending on the type of antenna design implemented, as will be described in further detail below.

Figure 4:
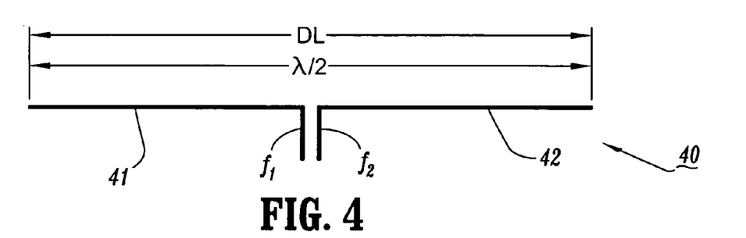
FIG. 4 schematically illustrates a single-band antenna structure that can be encapsulated in a plastic device cover, according to an exemplary embodiment of the invention.

Various types of antenna structures that can be molded into plastic covers according to exemplary embodiments of the invention will be discussed in detail hereafter. As noted above, embedded antenna structures can be formed with one or more wire elements or thin metal strips formed by stamping sheet metal. FIG. 4 schematically illustrates a single-band antenna structure according to an exemplary embodiment of the invention, which can be molded into a plastic cover. In particular, FIG. 4 depicts a center-fed, half-wavelength dipole antenna (40) comprising a first wire element (41) and a second wire element (42). The first and second wire elements (41) and (42) are first and second quarter-wave wire elements, respectively. The overall dipole length (DL) is a half-wavelength long, which varies depending on the desired resonant frequency, the dielectric constant of the plastic in which the antenna is encapsulated, etc.

The first wire element (41) comprises a first feed element (f1) and the second wire element comprises a second feed element (f2), wherein the feed elements (f1) and (f2) provide connection feed points for a balanced differential feed line. With the antenna (40) of FIG. 4, the wire elements (41) and (42) can be positioned in a cavity (mold) and subjected to an insert molding process. The feed lines (f1) and (f2) can be dimensioned to protrude from the surface of the plastic cover. In this manner, an external feed cable (or ribbon) can be connected to the protruding feed lines (f1) and (f2). For the center-fed dipole antenna (40), a balanced feed (differential feed line) is preferred since the feed point is at the current maximum point of the antenna. As such, an unbalanced feed line (e.g., coaxial cable) would provide poor antenna performance.

Figure 5:
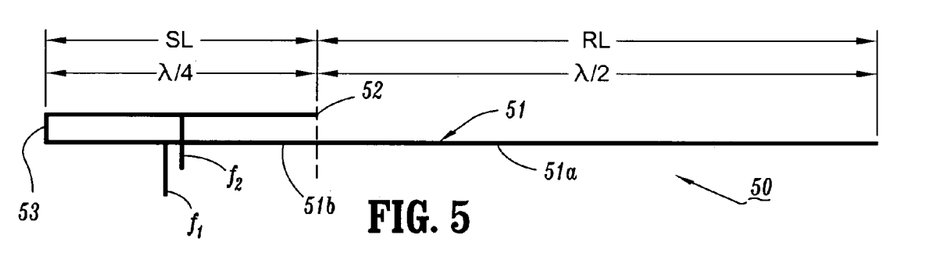
FIG. 5 schematically illustrates a single-band antenna structure that can be encapsulated in a plastic device cover, according to another exemplary embodiment of the invention.

FIG. 5 schematically illustrates a single-band antenna structure according to another exemplary embodiment of the invention, which can be molded into a plastic cover. In particular, FIG. 5 depicts a "J-type" antenna (50) structure that is formed by bending a single wire into a "J" shape. The J-type antenna (50) comprises a first element (51) and a second element (52) (or tuning stub element), which are short-circuited by a connecting element (53) at the ends thereof. More specifically, the J-type antenna (50) comprises a radiating element (51a) (having a length (RL) of ½ wavelength at the resonant frequency), which is fed at one end by means of a quarter-wavelength matching section (or impedance matching transformer) formed by two parallel conductors (51b) and (52) that are short-circuited by the connecting element (53). The elements (51b) and (52) each have a length (SL) of ¼ wavelength at the resonant frequency. The antenna element (51) includes both elements (51a) and (51b) and has a length of ¾ wavelength at the resonant frequency. Essentially, the J-type antenna (50) comprises an end-fed ½ wavelength dipole antenna (as opposed to the center-fed dipole of FIG. 4).

The first wire element (51) comprises a first feed wire (f1) and the second wire element (52) comprises a second feed wire (f2), wherein the feed wires (f1) and (f2) are feed connectors that enable connection between the antenna (50) and an external feeding line. More specifically, with the antenna (50) of FIG. 5, the feed wires (f1) and (f2) can be attached to the transformer section at a desired feed point for correct impedance matching, and dimensioned to protrude from the surface of the plastic cover upon completion of an insert molding process. In this manner, an external feeding cable can be connected to the protruding portions of the feed wires (f1) and (f2).

In the exemplary embodiment of FIG. 5, the external feed line may comprise a balanced (differential) feed line (e.g., ribbon-type transmission line) or an unbalanced feed line (e.g., coaxial cable). Although a balanced feed line would provide optimal performance, an unbalanced feed line (e.g., coaxial feed) would provide good performance since the antenna feed point is located away from the maximum current point. In other words, the impedance of the antenna (50) can be adjusted based on the distance of the feed lines (f1) and (f2) from the connecting element (53) of the transformer. When connecting to a coaxial cable, the center conductor of the coaxial cable is connected to the conductor element (51b) of the Q-line (which is connected to the radiating element (51a)) at a given feed point distance from the connecting element (53) and the outer shield of the coaxial cable is connected to the stub element (52) at the same feed point distance from the connecting element (53).

Figure 6A:
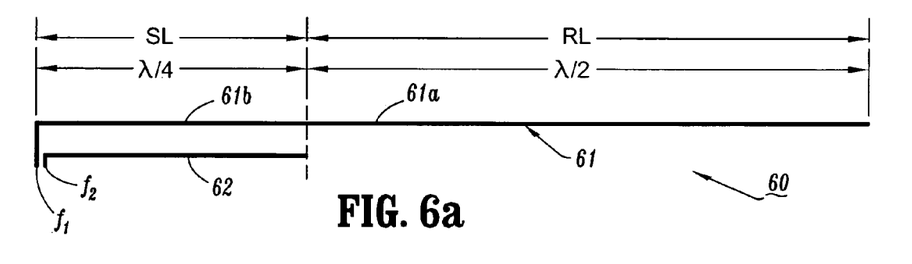
FIGS. 6A schematically illustrates a single-band antenna structure that can be encapsulated in a plastic device cover, according to another exemplary embodiment of the invention.
Figure 6B:
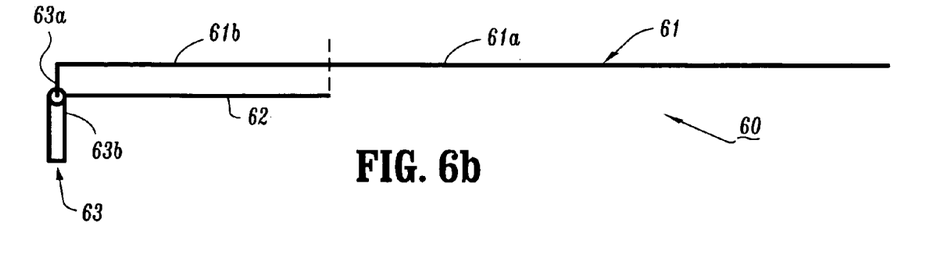
FIGS. 6B schematically illustrates a single-band antenna structure that can be encapsulated in a plastic device cover, according to another exemplary embodiment of the invention.

FIGS. 6A and 6B schematically illustrate a single-band antenna according to another embodiment of the invention. In particular, FIGS. 6A and 6B depict an antenna structure (60) comprising a modified version of the J-type antenna (50) of FIG. 5, wherein the antenna (60) comprises separate wire elements (61) and (62), wherein a portion (61a) of wire element (61) and wire element (62) form a Q-line (as discussed above), and wherein element portion (61a) comprises a ½ wavelength radiator. Moreover, the respective feed points (f1) and (f2) are at the ends of the elements (61b) and (62). FIG. 6A illustrates the antenna (60) that is feed with an external balanced differential feed connection, whereas FIG. 6B illustrates the antenna (60) fed with a coaxial cable (63), wherein the end of element portion (61b) is connected to a center conductor (63a) of the coaxial cable (63) and the end of the stub element (62) is connected to the outer shield (63b) of the coaxial cable (63). Although the antenna (60) structure is suitable for coaxial feeding, impedance matching is difficult since there is no tuning mechanism (as in FIG. 5).

Figure 7:
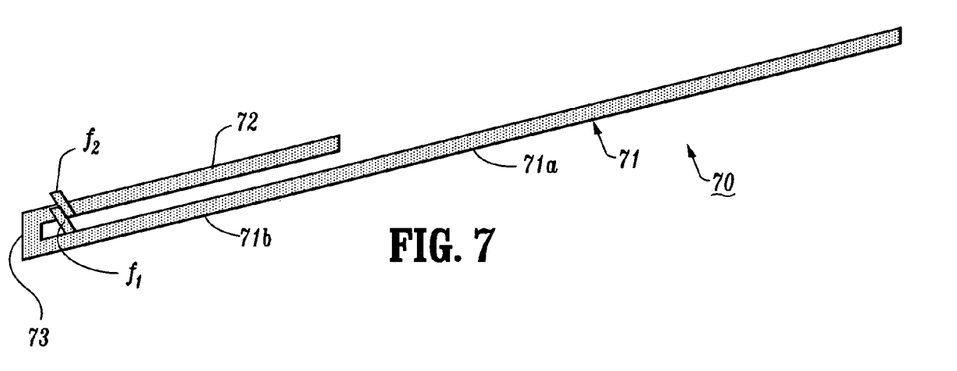
FIG. 7 schematically illustrates a single-band antenna structure that can be encapsulated in a plastic device cover, according to another exemplary embodiment of the invention.
Figure 8:
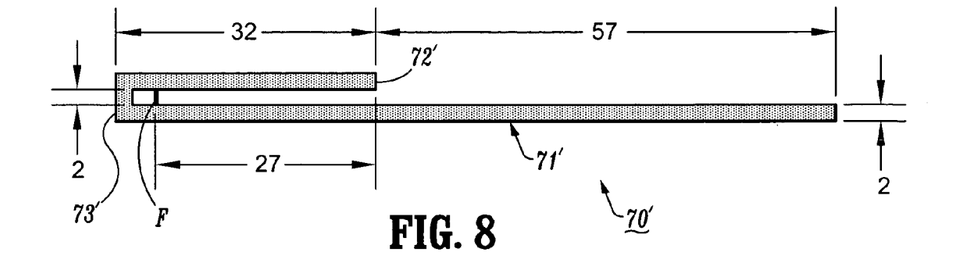
FIG. 8 schematically illustrates exemplary dimensions for the single-band antenna structure of FIG. 7 to provide an antenna design for operation in the 2.4 GHz ISM band, according to another exemplary embodiment of the invention.

FIGS. 7 and 8 are schematic diagrams illustrating exemplary embodiments of a single-band antenna J-type antenna, which can be formed from stamped sheet metal (e.g., copper, brass, gold, etc.). More specifically, FIG. 7 is a schematic perspective view of a stamped-metal multiband antenna (70) comprising elements (71) and (72) which are short-circuited at one end by connecting element (73). As with the J-type antenna designs discussed above, the antenna element (71) comprises a first portion (71a) which comprises a ½ wavelength radiator, and a second portion (71b) that forms part of a Q-line (with stub element ((72)) for feeding the radiator (71a). Moreover, the antenna (70) comprises feed tabs (f1) and (f2) which are connected (e.g., soldered) to respective elements (71) and (72) at a certain distance from connecting element (73) to provide a desired impedance. The two feeding tabs (f1) and (f2) designed to protrude from the surface of the plastic cover to thereby enable connection to a feeding cable (e.g., balanced line wire ribbon).

FIG. 8 schematically illustrates a stamped J-type antenna (70') according to an exemplary embodiment of the invention, depicting structural dimensions (in millimeters) for the exemplary antenna (70) of FIG. 7 for operation in the 2.4 GHz frequency band (e.g., 2.4 GHz-2.5 GHz). For purposes of determining electrical properties and characteristics of an antenna design according to the invention, a computer model of the exemplary antenna (70') was generated and simulated SWR (standing wave ratio) measurements were as a function of frequency in a 2.4 GHz frequency band for the exemplary J-type antenna (70').

Figure 10:
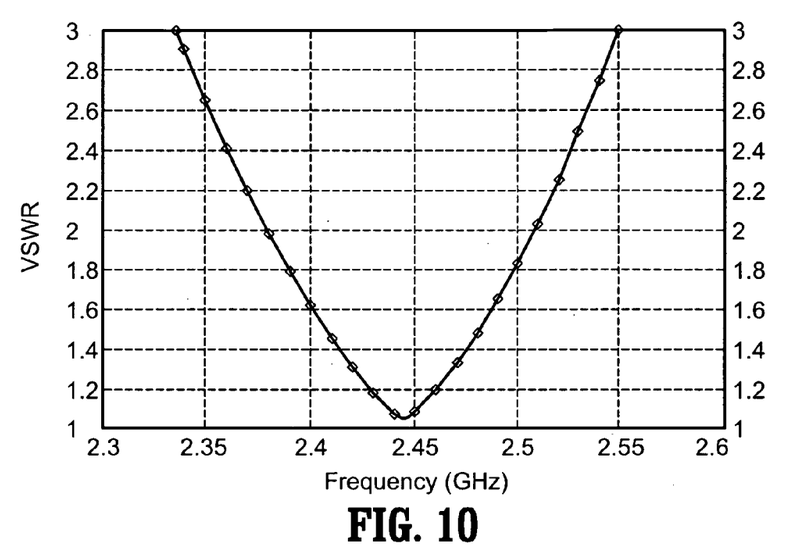
FIG. 10 graphically illustrates SWR (standing wave ratio) results obtained from a computer simulation of the exemplary antenna stricture of FIG. 8.

FIG. 10 graphically depicts a simulated return loss that was obtained for the exemplary antenna (70') design in air. As depicted in FIG. 10, the simulated return loss (VSWR or simply SWR) for antenna (70') from 2.3-2.6 Ghz illustrates one resonance in the 2.4 GHz to 2.5 GHz band, providing a center frequency of about 2.45 GHz. Moreover, FIG. 10 illustrates that the antenna (70') provides sufficient SWR bandwidth (2:1) for the entire band from 2.4 GHz to 2.5 GHz.

Figure 9:
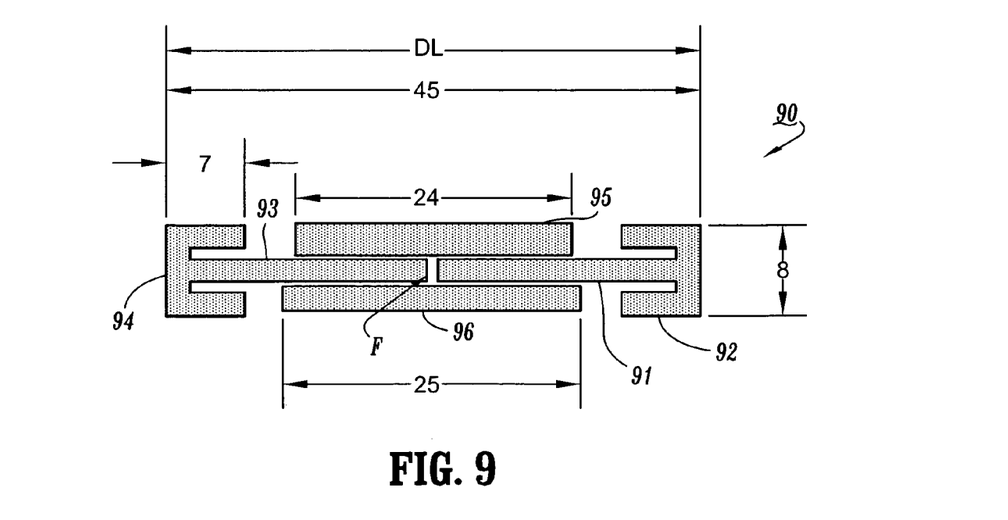
FIG. 9 schematically illustrates a multi-band antenna structure that can be encapsulated in a plastic device cover, according to an exemplary embodiment of the invention.

FIG. 9 schematically illustrates a multi-band antenna according to an exemplary embodiment of the invention, which can be molded into a plastic cover. More specifically, FIG. 9 schematically depicts a stamped multiband antenna (90) and relevant dimensions (in mm) of the various antenna elements to enable operation in the 2.4 GHz and 5 GHz bands for WLAN applications. The antenna (90) comprises a center-fed, end-loaded dipole antenna structure comprising radiating elements (91), (92), (93) and (94), and first and second coupled elements (95) and (96).

The radiating element pairs (91), (92) and radiating element pairs (93), (94), each comprises a quarter-wavelength element, wherein the element portions (92) and (94) comprise "hat" element (92) and (94). The "hat" elements (92) and (94) provide the required reactance to enable the overall dipole length (DL) (½ wavelength) of the center fed dipole to span a shorter distance as would be required without the hat elements, and to ensure that the antenna (90) is matched to a 50 Ohms feeding cable, for instance.

In the exemplary embodiment of FIG. 9, the end-loaded dipole antenna is structured and dimensioned to operate at a first resonant frequency (F1), the first coupled element (95) is structured and dimensioned to operate a second resonant frequency (F2) and the second coupled element (96) is structured and dimensioned to operate at a third resonant frequency (F3). The antenna (90) can be used to provide tri-band operation, wherein the various elements have resonant frequencies in distance frequency bands where F1<F2<F3 or where F1<F3<F2. Moreover, the antenna (90) can be used to provide dual-band operation, wherein the coupled elements (95) and (96) are designed to operate at resonant frequencies F2 and F3 that are sufficiently close to effectively provide a frequency band of operation with a wide bandwith.

For instance, a multiband antenna (90) having the exemplary dimensions (in mm) depicted in FIG. 9 enables dual-band operation for the 2.4 GHz and 5 GHz WLAN applications, wherein the end-loaded dipole structure (comprising elements 91, 92, 93 and 94) provides a resonant frequency in the 2.4 GHz band and the two closely coupled elements (95) and (96) provide resonant frequencies in the 5 GHz band to provide a wide bandwith in the 5 GHz band.

Figure 11:
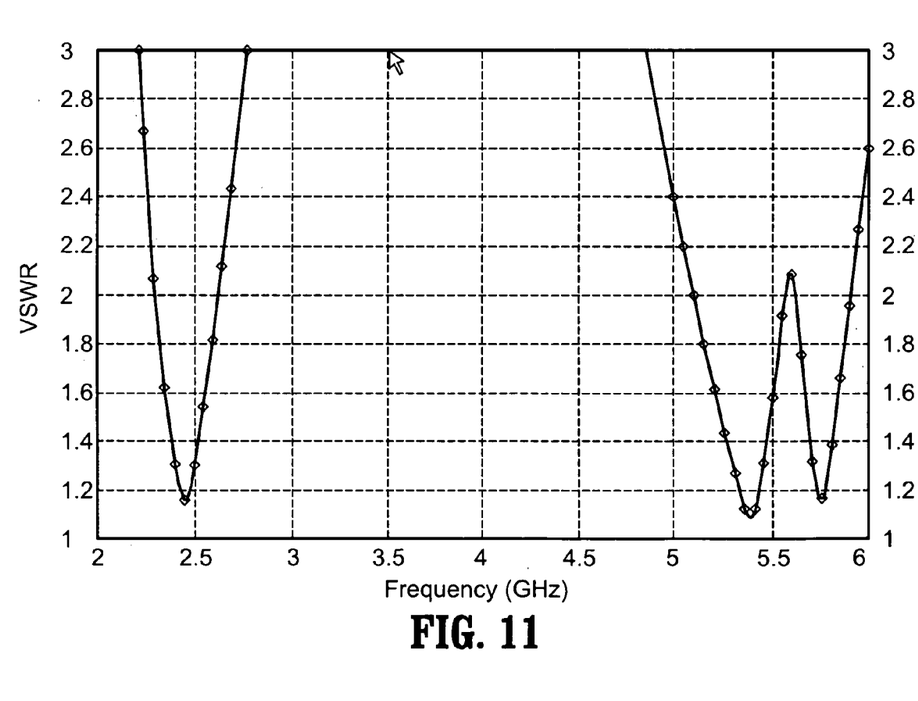
FIG. 11 graphically illustrates SWR results obtained from a computer simulation of the exemplary antenna stricture of FIG. 9.

For purposes of determining electrical properties and characteristics of the antenna design (90) according to an exemplary embodiment of the invention, a computer model of the exemplary antenna (90) was generated using the dimensions depicted in FIG. 9, and FIG. 11 graphically illustrates the simulated SWR (standing wave ratio) measurements were obtained for the exemplary antenna (90) design in air. More specifically, as depicted in FIG. 11, the simulated return loss (VSWR or simply SWR) for the exemplary antenna (90) design is shown over bandwith from 2 GHZ to 6 Ghz, wherein one resonance is shown in the low band (2.4 GHz to 2.5 GHz) providing a center frequency of about 2.45 GHz) and sufficient SWR bandwidth (2:1) for the entire band from 2.4 GHz to 2.5 GHz. Moreover, FIG. 11 illustrates that the exemplary antenna (90) provides 2 resonances (5.35 GHz and 5.75 GHZ) in the upper band (e.g., from 5.15 GHz~5.825 GHz), and providing sufficient SWR bandwidth (2:1) for the entire 5 GHz U-NII (unlicensed national information infrastructure) band from 5.15~5.825 GHz, for example.

It is to be understood that the exemplary antenna structures discussed herein are for purposes of illustration and that one of ordinary skill in the art can readily envision other antenna designs and methods for building antenna devices based on the teachings herein. For example, besides the exemplary antenna structures described above, other types of antenna structures may be encapsulated in plastic device covers to build antenna devices. For purposes of space saving, such antennas preferably include various groundless antenna types (i.e., antennas that do not require a ground element). However, antenna types that require grounds can be used when there is adequate space for encapsulating the antenna is the desired position in the plastic device cover.

Figure 12:
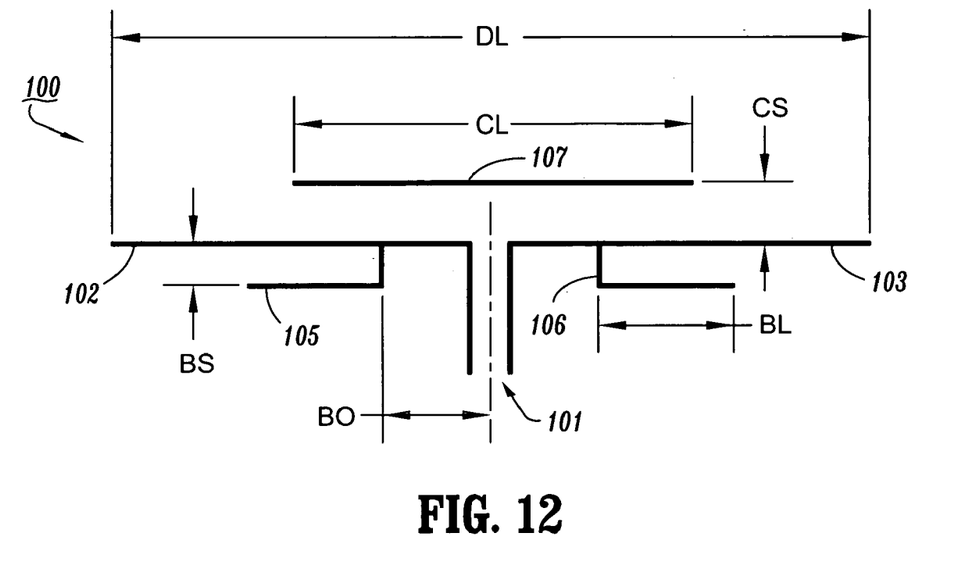
FIG. 12 schematically illustrates a multi-band antenna structure that can be encapsulated in a plastic device cover, according to another exemplary embodiment of the invention.

For example, FIG. 12 schematically illustrates a multi-band dipole antenna (100) according to an exemplary embodiment of the invention, wherein the multiband dipole antenna (100) is fed using a balanced transmission line (101). The multiband dipole antenna (100) comprises radiating elements (102) and (103), which provide dipole operation in a first frequency band (having the lowest resonant frequency). In addition, the dipole multiband antenna (100) comprises a coupled radiating element (107) and branch radiating elements (105) and (106). The exemplary multi-band dipole antenna (100) can provide dual-band or tri-band operation and can be implemented for applications that using a balanced feed or which do not require a ground plane (i.e., ground plane independent).

FIG. 12 illustrates various dimensions and parameters of the exemplary dipole multiband antenna (100), which can be adjusted for tuning the antenna (100). A first (lowest) resonant frequency F1 is determined by the length (DL) of the dipole element (which includes elements (102) and (103)). In one embodiment, the dipole length (DL) is about ½ of the wavelength of F1. A second resonant frequency F2 is determined by the length (CL) of the coupled element (107). The impedance at the second resonant frequency F2 is determined by the coupling distance (CS) between the coupled element (107) and the dipole element ((102) and (103)). A third resonant frequency F3 is determined by the length (BS+BL) of the branch elements (105) and (106). Furthermore, the distance (BO) between the branch elements (105) and (106) and the center point of the balanced line (101) can be adjusted to change the impedance at the third resonant frequency F3, which also shifts F3 to some extent.

Figure 13:
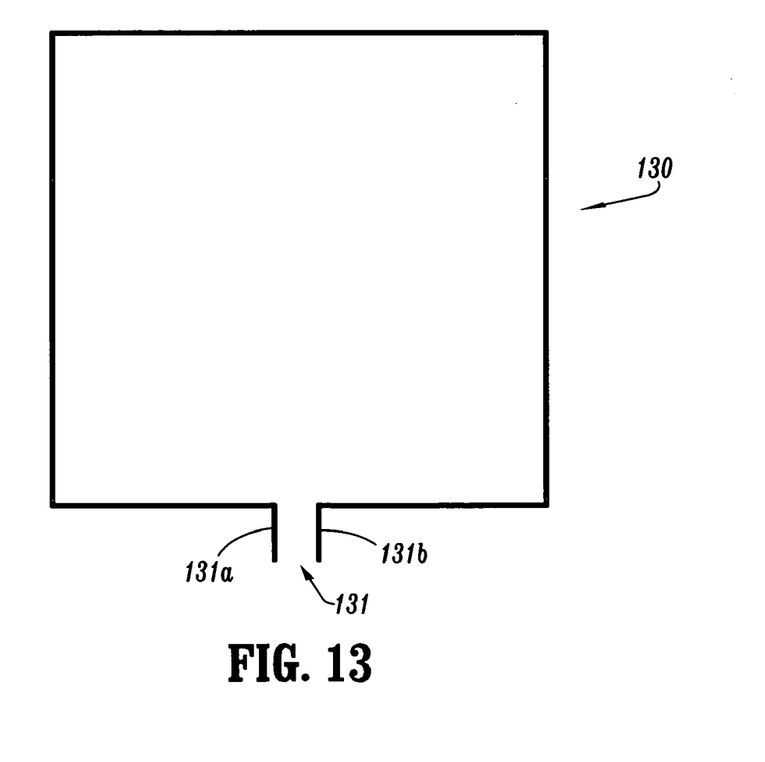
FIG. 13 schematically illustrates a single-band antenna structure that can be encapsulated in a plastic device cover, according to another exemplary embodiment of the invention.

FIG. 13 schematically illustrates a single-band antenna according to another embodiment of the invention which can be encapsulated in a plastic device cover. In particular, FIG. 13 schematically illustrates a loop antenna (130) that can be formed of a single bent wire or stamped metallic strip. The antenna (130) comprises a feed point (131) comprising feed connectors (131a) and (131b) which can be fed using methods described herein.

Figure 14:
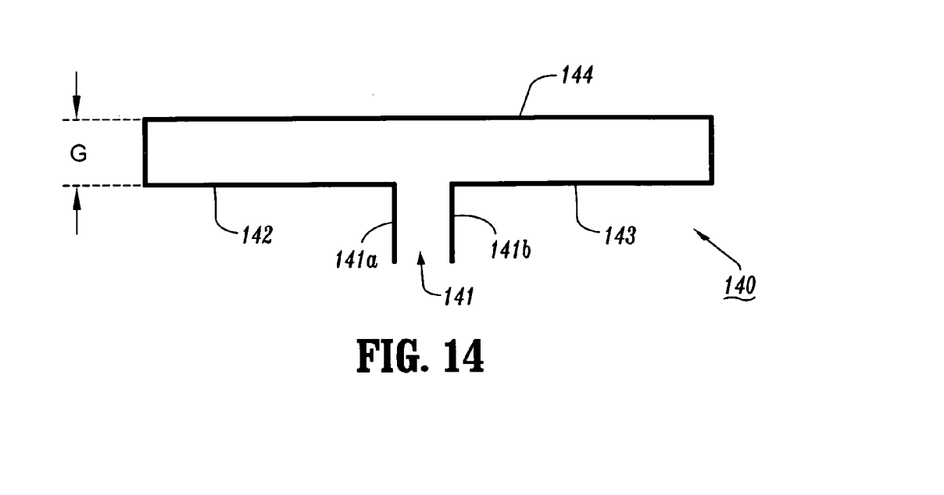
FIG. 14 schematically illustrates a single-band antenna structure that can be encapsulated in a plastic device cover, according to another exemplary embodiment of the invention.

Moreover, FIG. 14 schematically illustrates a single-band antenna according to another embodiment of the invention which can be encapsulated in a plastic device cover. In particular, FIG. 14 schematically illustrates a folded dipole antenna (140) that can be formed of a single bent wire or stamped metallic strip. The antenna (140) comprises a feed point (141) comprising feed connectors (141a) and (141b) which can be fed using methods described herein. In the exemplary embodiment of FIG. 14, elements (142) and (143) are quarter-wave elements that comprise a first (fed)

half-wavelength dipole element, and element (144) comprises a second half-wavelength dipole element. The first and second half-wavelength elements are disposed substantial parallel to each other and separated by a gap (G). The end portions of elements (142) and (143) are connected (shorted) to end portions of the second dipole element (144).

Figure 15:
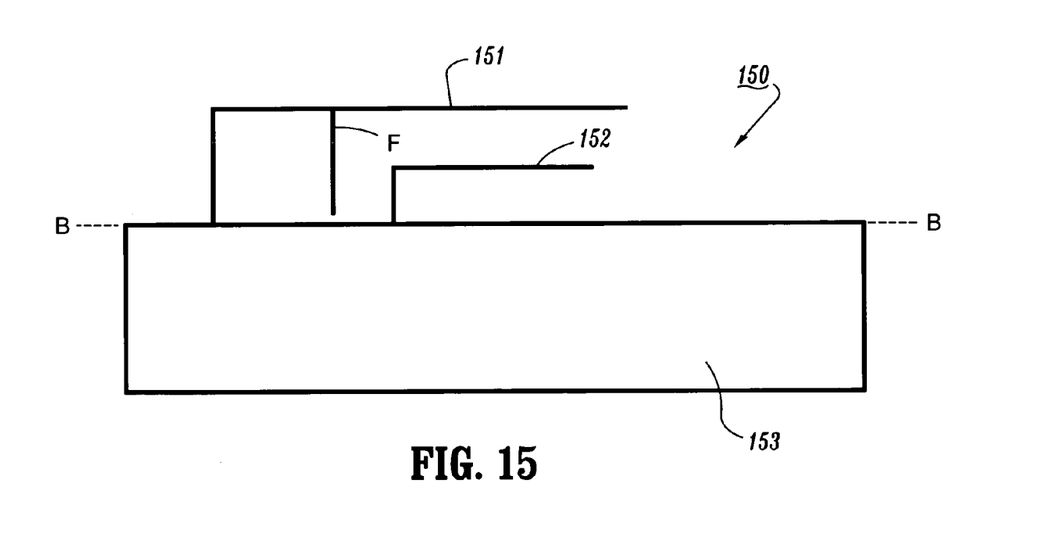
FIG. 15 schematically illustrates an inverted-F dual-band antenna structure that can be encapsulated in a plastic device cover, according to another embodiment of the present invention.

FIG. 15 is a schematic diagram illustrating an inverted-F dual-band antenna (150) that can be fabricated using metal wires or by stamping a metal sheet. The exemplary inverted-F dual-band antenna (150) comprises a first radiating element (151) (or inverted-F antenna element), and a second radiating element (152) (or inverted-L antenna element). The first and second radiating elements (151) and (152) are connected to a ground element (153). For a lower frequency band of operation of the antenna (150), the resonant frequency of the first radiating element (151) is determined primarily by the total length of the first radiating element, which total length is about one quarter wavelength long at the center of the lower frequency band. For a high frequency band of operation of the antenna (150), the resonant frequency of the second radiating element (152) is determined primarily by the total length of the second radiating element (152), which total length is about one-quarter wavelength long at the center of the high band.

The antenna (150) comprises an antenna feed element (F) connected to the first radiating element (151). The feed element F provides means for connecting a signal feed to the antenna (e.g., connecting an inner conductor of a coaxial cable to F). In general, the impedance of the antenna in the low band can be changed by moving the feed point back and forth along the first radiating element (151) and the antenna impedance in the high band is primarily determined by the coupling distances between the first and second radiating elements.

In accordance with one exemplary embodiment of the invention, the antenna (150) encapsulated in a plastic display cover can be fed using an external coaxial cable. In such embodiment, the end portion of the feed tab (F) can be bent to protrude from the plastic display cover to connect to an inner conductor of a coaxial transmission line. The ground element (153) is connected to an outer conductor (or outer metal shield) of the coaxial cable. In this regards, a protruding element connected to the encapsulated ground element (153) can be used to enable connection of the outer shield of the coaxial cable to the ground element (153). In another exemplary embodiment of the invention, the ground plane (153) may be exposed for direct connection to a feed line. More specifically, by way of example with reference to the exemplary antenna structures (37) and (150) of FIGS. 3 and 15, respectively, the ground element (153) can be bent along line BB (FIG. 15) such that the ground plane is orthogonal to the antenna element plane and is disposed on the surface of the back panel (31) (as opposed to encapsulated in the back panel (31)), while the antenna radiating elements are encapsulated in the side panel (35). In this instance, the coaxial ground shield can be directly connected to the exposed ground element (153).

It is to be appreciated that exemplary antenna frameworks according to the invention provide flexible and low cost designs that can be implemented for a variety of wireless applications. For example, multiband antennas according to the invention can be used for WLAN (Wireless Local Area Network) applications for providing tri-band operation in the 2.4-2.5 GHz, 4.9-5.35 GHz and 5.15-5.85 GHz frequency ranges. Moreover, exemplary antenna frameworks according to the invention can be implemented for dual-band, tri-band or quad-band operation for cellular applications (e.g., 824-894 MHz AMPS or Digital Cellular, 880-960 MHz GSM, 1710-1880 MHz DC1800, and/or 1850-1990 MHz PCS). In accordance with the invention, multiband antennas with one feed provide advantages, such as saving very expensive RF connectors and coaxial cables, over multi-feed antennas for cellular and WLAN applications. Advantageously, embedded antenna designs support many antenna types as noted above, and provide many advantages such as smaller antenna size, low manufacturing costs, compatibility with standard industrial laptop/display architectures, and reliable performance.

Although illustrative embodiments have been described herein with reference to the accompanying drawings, it is to be understood that the present invention is not limited to those precise embodiments, and that various other changes and modifications may be affected therein by one skilled in the art without departing from the scope of the invention.

What is claimed is:

1. A device, comprising:
a plastic device cover; and
an antenna having one or more radiator elements fixedly encapsulated within plastic material forming the plastic device cover, and a feed element attached to a feed point of the fixedly encapsulated antenna, wherein a portion of the feed element protrudes from a surface of the plastic device cover.

2. The device of claim 1, wherein the device is a laptop computer comprising a display unit, and wherein the plastic device cover is cover for the display unit.

3. The device of claim 1, further comprising a feeding cable connected to the protruding portion of the feed element.

4. The device of claim 3, wherein the feeding cable comprises a balanced feed line.

5. The device of claim 3, wherein the feeding cable comprises a coaxial cable.

6. The antenna of claim 1, wherein the antenna is a single-band antenna providing a resonant frequency in a frequency band of operation.

7. The device of claim 1, wherein the antenna comprises a multiband antenna, wherein the multiband antenna provides a first resonant frequency in a first frequency band of operation and a second resonant frequency in a second band of operation.

8. The device of claim 7, wherein the multiband antenna provides a third resonant frequency in the second band of operation.

9. The device of claim 8, wherein the first frequency band is about 2.4 GHz to about 2.5 GHz, and wherein the second frequency band is about 5.15 GHz to about 5.85 GHz.

10. The device of claim 1, wherein the antenna is formed with one or more metal wires.

11. The device of claim 1, wherein the antenna is formed with one or more metal strips.

12. The device of claim 1, wherein the antenna is a dipole antenna.

13. The device of claim 12, wherein the dipole antenna comprises one or more branched elements.

14. The device of claim 12, wherein the dipole antenna comprises one or more coupled elements.

15. The device of claim 1, wherein the antenna is a J-type antenna.

16. The device of claim 1, wherein the antenna is a folded dipole antenna.

17. The device of claim 1, wherein the antenna is a center-fed, end-loaded dipole antenna.

18. The device of claim 17, wherein the center-fed, end loaded dipole antenna comprises one or more coupled elements.

19. The device of claim 1, wherein the antenna is a loop antenna.

20. The device of claim 1, wherein the antenna is a groundless antenna.

21. The device of claim 1, wherein the antenna comprises a ground element.

22. A device, comprising:
a plastic device cover;
an antenna having one or more radiator elements fixedly encapsulated within plastic material forming the plastic device cover; and
one or more metal plates disposed on the surface of the plastic display cover adjacent a feed point connector of the fixedly encapsulated antenna to provide a capacitive coupled feed mechanism.

23. A portable laptop computer device, comprising:
a display unit comprising a plastic display cover; and
an antenna having one or more radiator elements fixedly encapsulated within plastic material forming the plastic display cover, and a feed element attached to a feed point of the fixedly encapsulated antenna, wherein a portion of the feed element protrudes from a surface of the plastic display cover.

24. The device of claim 23, further comprising a feeding cable connected to the protruding portion of the feed element.

25. The device of claim 24, wherein the feeding cable comprises a balanced feed line.

26. The device of claim 24, wherein the feeding cable comprises a coaxial cable.

27. The device of claim 23, wherein the antenna has a resonant frequency in the 2.4 GHz ISM band.

28. The device of claim 23, wherein the antenna has a resonant frequency in the 5 GHz U-NII (unlicensed national information infrastructure) band.

29. The device of claim 23, wherein the antenna is a dipole antenna.

30. The device of claim 29, wherein the dipole antenna comprises one or more coupled elements.

31. The device of claim 23, wherein the antenna is a J-type antenna.

32. The device of claim 23, wherein the antenna is a folded dipole antenna.

33. The device of claim 23, wherein the antenna is a center-fed, end-loaded dipole antenna.

34. The device of claim 33, wherein the center-fed, end loaded dipole antenna comprises one or more coupled elements.

35. The device of claim 23, wherein the antenna is a loop antenna.

36. The device of claim 23, wherein the antenna comprises a ground element.

37. The device of claim 23, wherein the antenna is a groundless antenna.

* * * * *